(12) United States Patent
Ahn (10) Patent No.: US 10,631,338 B2
(45) Date of Patent: *Apr. 21, 2020

(54) COMMUNICATION METHOD IN UNLICENSED BAND AND DEVICE USING SAME

(71) Applicant: LG ELECTRONICS INC., Seoul (KR)

(72) Inventor: Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,167

(22) Filed: Jul. 15, 2019

(65) Prior Publication Data

US 2019/0342919 A1 Nov. 7, 2019

Related U.S. Application Data

(63) Continuation of application No. 15/737,637, filed as application No. PCT/KR2016/006557 on Jun. 21, 2016, now Pat. No. 10,412,765.

(60) Provisional application No. 62/182,630, filed on Jun. 21, 2015.

(51) Int. Cl.
*H04W 74/08* (2009.01)
*H04W 28/26* (2009.01)
*H04W 72/12* (2009.01)
*H04W 16/14* (2009.01)

(52) U.S. Cl.
CPC ....... *H04W 74/0816* (2013.01); *H04W 28/26* (2013.01); *H04W 72/12* (2013.01); *H04W 72/1278* (2013.01); *H04W 74/08* (2013.01); *H04W 16/14* (2013.01)

(58) Field of Classification Search
CPC . H04W 28/26; H04W 72/12; H04W 74/0816; H04W 72/1278; H04W 74/08
See application file for complete search history.

(56) References Cited

U.S. PATENT DOCUMENTS

| 2004/0127225 | A1 | 7/2004 | Qiu et al. |
| 2005/0286477 | A1 | 12/2005 | Gupta et al. |
| 2014/0079015 | A1 | 3/2014 | Kim et al. |

(Continued)

FOREIGN PATENT DOCUMENTS

| EP | 3046365 | 7/2016 |
| KR | 1020100052523 | 5/2010 |

(Continued)

OTHER PUBLICATIONS

U.S. Appl. No. 15/737,637, Office Action dated Dec. 21, 2018, 14 pages.

(Continued)

*Primary Examiner* — Gbemileke J Onamuti
(74) *Attorney, Agent, or Firm* — Lee, Hong, Degerman, Kang & Waimey (57) ABSTRACT

Provided are a communication method in an unlicensed band and a device using same. If the device succeeds in clear channel assessment (CCA) during a reservation time in an unlicensed band, the device transmits a reservation signal and detects reservation signals received from other wireless devices during the reservation time. According to the detection results, the device determines whether to transmit data during a data time corresponding to the reservation time.

20 Claims, 9 Drawing Sheets (56) References Cited

U.S. PATENT DOCUMENTS

| | | |
|---|---|---|
| 2014/0362780 A1 | 12/2014 | Malladi et al. |
| 2015/0365880 A1 | 12/2015 | Malladi et al. |
| 2016/0105897 A1 | 4/2016 | Liu et al. |
| 2016/0262023 A1 | 9/2016 | Hiertz et al. |
| 2018/0199374 A1 | 7/2018 | Ann |

FOREIGN PATENT DOCUMENTS

| | | |
|---|---|---|
| KR | 1020140031203 | 3/2014 |
| WO | 2011082526 | 7/2011 |
| WO | 2013006006 | 1/2013 |
| WO | 2015062082 | 5/2015 |

OTHER PUBLICATIONS

European Patent Office Application Serial No. 16814646.2, Search Report dated Dec. 13, 2018, 7 pages.

PCT International Application No. PCT/KR2016/006557, International Search Report dated Sep. 1, 2016, 2 pages.

COMMUNICATION METHOD IN UNLICENSED BAND AND DEVICE USING SAME

CROSS-REFERENCE TO RELATED APPLICATIONS

This application is a continuation of U.S. patent application Ser. No. 15/737,637, filed on Dec. 18, 2017, now U.S. Pat. No. 10,412,765, which is the National Stage filing under 35 U.S.C. 371 of International Application No. PCT/KR2016/006557, filed on Jun. 21, 2016, which claims the benefit of U.S. Provisional Application No. 62/182,630, filed on Jun. 21, 2015, the contents of which are all hereby incorporated by reference herein in their entirety.

BACKGROUND OF THE INVENTION

Field of the Invention

The present invention relates to wireless communication, and more particularly, to a communication method in an unlicensed band, and a device using the same.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for communicating in an unlicensed band and a device using the same.

In an aspect, a method for communicating in an unlicensed band includes transmitting, by a wireless device, the reservation signal when succeeding in clear channel assessment (CCA) in an unlicensed band during a reservation time, attempting, by the wireless device, to detect a reservation signal transmitted by another wireless device during the reservation time, and determining, by the wireless device, whether to transmit data during a data time corresponding to the reservation time depending on the detection result.

When the detected reservation signal has a higher priority than the transmitted reservation signal during the reservation time, the wireless device may determine not to transmit the data.

When the detected reservation signal has a lower priority than the transmitted reservation signal or no reservation signal is detected during the reservation time, the wireless device may determine to transmit the data.

When the detected reservation signal has the same priority as the transmitted reservation signal detected during the reservation time, the wireless device may randomly select to transmit the data or not to transmit the data.

In another aspect, a device for communication in an unlicensed band includes a transceiver configured to transmit or receive a radio signal, and a processor connected to the transceiver. The processor is configured to control the transceiver to transmit the reservation signal when succeeding in clear channel assessment (CCA) in an unlicensed band during a reservation time, control the transceiver to attempt to detect a reservation signal transmitted by another wireless device during the reservation time, and determine whether to transmit data during a data time corresponding to the reservation time depending on the detection result.

In an environment where various communication protocols co-exist in an unlicensed band, interference can be mitigated.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc.

The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
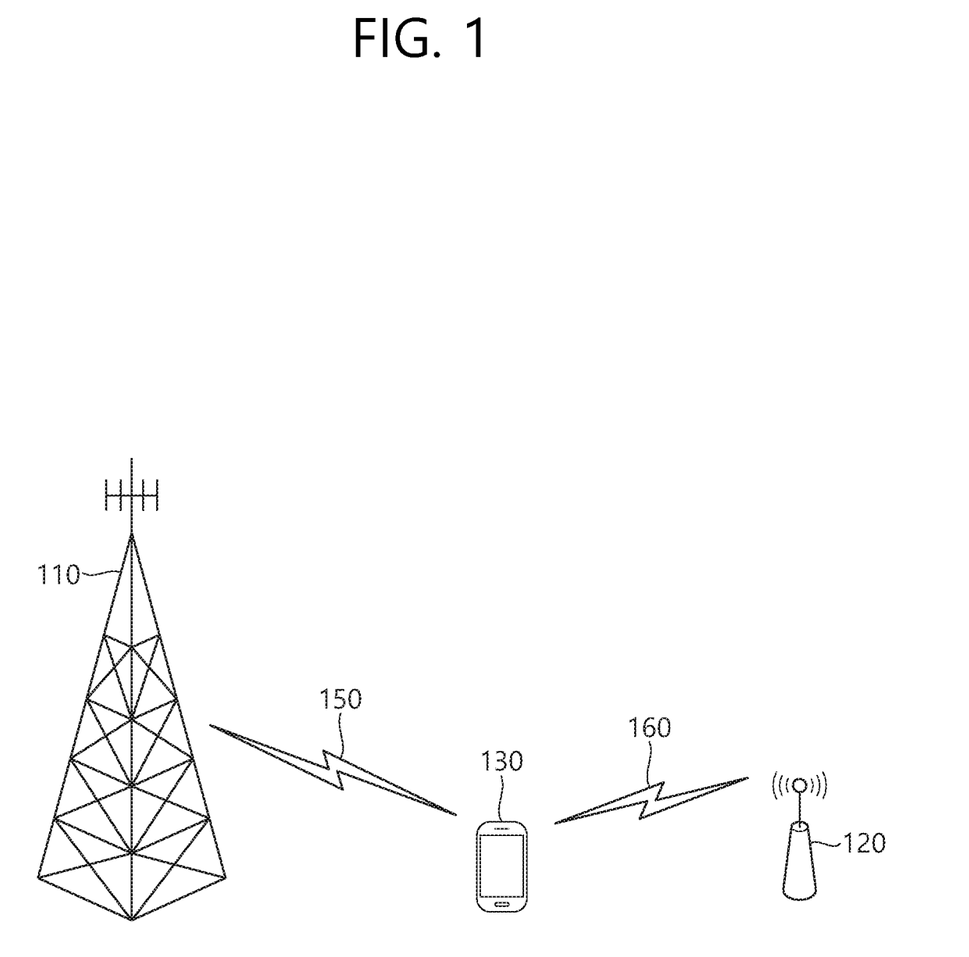
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For UL traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

There is a plurality of communication nodes in an unlicensed band. When the communication nodes transmit a signal using the same radio resource (time, frequency, or the like) at the same time, a collision occurs. A method for avoiding a decrease in reception performance due to a collision is proposed.

Hereinafter, it is assumed that a UE has the capability of simultaneously performing transmission and reception through the same radio resource (for example, the capability of transmitting a transmission signal at a particular time, simultaneously receiving a signal transmitted to a receiver while canceling interference by the transmission signal).

Figure 2:
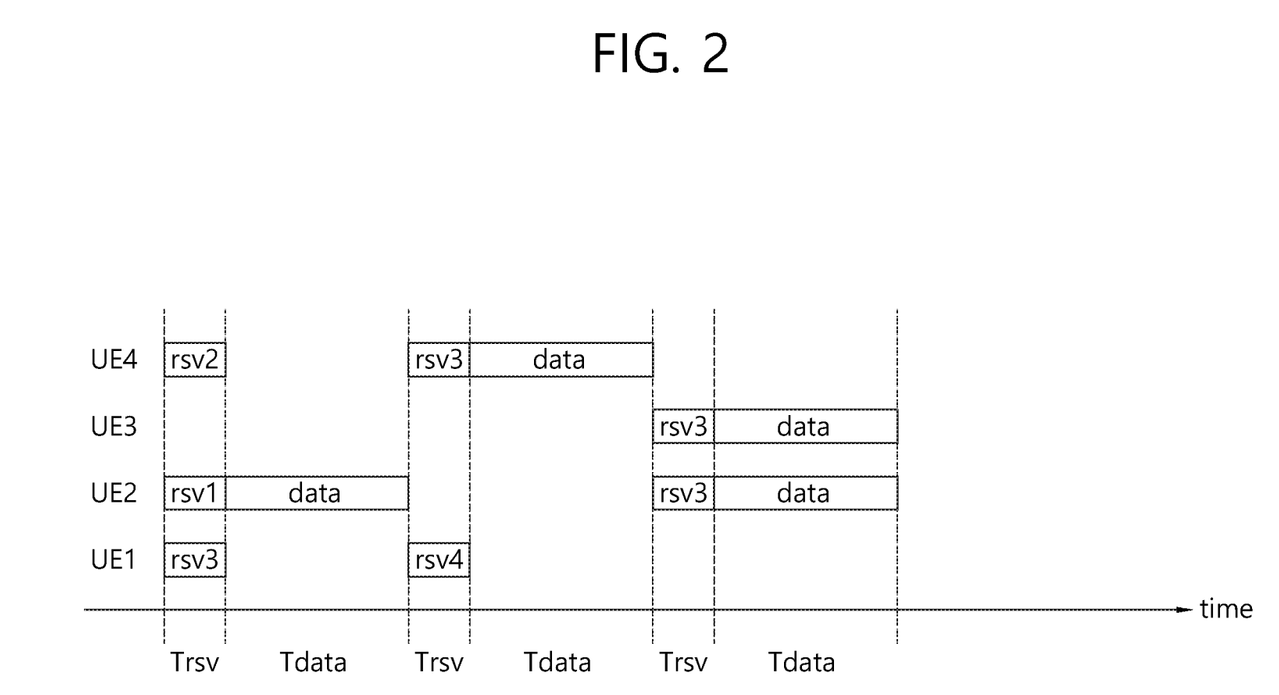
FIG. 2 illustrates a communication method according to one embodiment of the present invention.

FIG. 2 illustrates a communication method according to one embodiment of the present invention.

A reservation time (denoted by 'Trsv') is a period in which a UE reserves a radio resource. A data time (denoted by 'Tdata') is a period in which a UE actually can transmit traffic data to another UE or a BS.

A reservation time and a data time may occur in succession. Alternatively, a reservation time and a data time may overlap. Although the start/end of a reservation time or the start/end of a data time is not necessarily aligned with a time slot, it is assumed that there is a time slot in the following embodiments.

A UE that has succeeded in CCA may transmit a reservation signal during a reservation time. The reservation signal may be transmitted in Nrsv different waveforms. The reservation signal may be assigned priority by signal or group. For example, it is assumed that there are four reservation signals rsv1, rsv2, rsv3, and rsv4, and priority is assigned such that rsv1>rsv2>rsv3>rsv4. The UE may transmit a reservation signal randomly selected from among the plurality of reservation signals during a Trsv. At the same time, the UE may detect a reservation signal transmitted by another UE during a Trsv and may determine whether to transmit data during the following Tdata based on the priority of the reservation signal thereof.

During a first Trsv, UE1, UE2, and UE4, which have succeeded in CCA, transmit rsv3, rsv1, and rsv2, respectively. Since rsv1 has the highest priority, UE2 transmits data during a first Tdata.

During a second Trsv, UE1 and UE4, which have succeeded in CCA, transmit rsv4 and rsv3, respectively. Since rsv3 has higher priority, UE4 transmits data during a second Tdata.

During a third Trsv, UE2 and UE3, which have succeeded in CCA, transmit rsv3 and rsv3, respectively. Since the signals have the same priority, both UE2 and UE3 transmit data during a third Tdata.

In detail, the UE may determine whether to perform transmission based on the priority of a reservation signal as follows.

(1) When a reservation signal having higher priority than the reservation signal transmitted by the UE is detected during the reservation time, the UE gives up signal transmission in the subsequent data period.

(2) When only a reservation signal having lower priority than the reservation signal transmitted by the UE is detected during the reservation time, the UE transmits a signal in the subsequent data period.

(3) When no reservation signal transmitted by another UE is detected during the reservation time, the UE transmits a signal in the subsequent data period.

(4) When only a reservation signal having the same priority as the reservation signal transmitted by the UE is detected during the reservation time, the UE may perform at least one of the following operations.

(4-1) The UE transmits a signal in the subsequent data period.

(4-2) The UE gives up signal transmission in the subsequent data period.

(4-3) The UE may randomly select (4-1) or (4-2).

(4-4) The UE may select (4-1) or (4-2) according to a specific probability. The specific probability may be designated by a BS.

The reservation signal may be transmitted during the entire Trsv or during some of the Trsv.

Reservation signals may be distinguished by different modulation sequences, different time-code-frequency resources, or different levels of power. For example, when a reservation signal is distinguished by a time-frequency resource, the UE may determine whether a corresponding reservation signal has been transmitted based on whether a signal is detected in a particular time-frequency resource.

Figure 3:
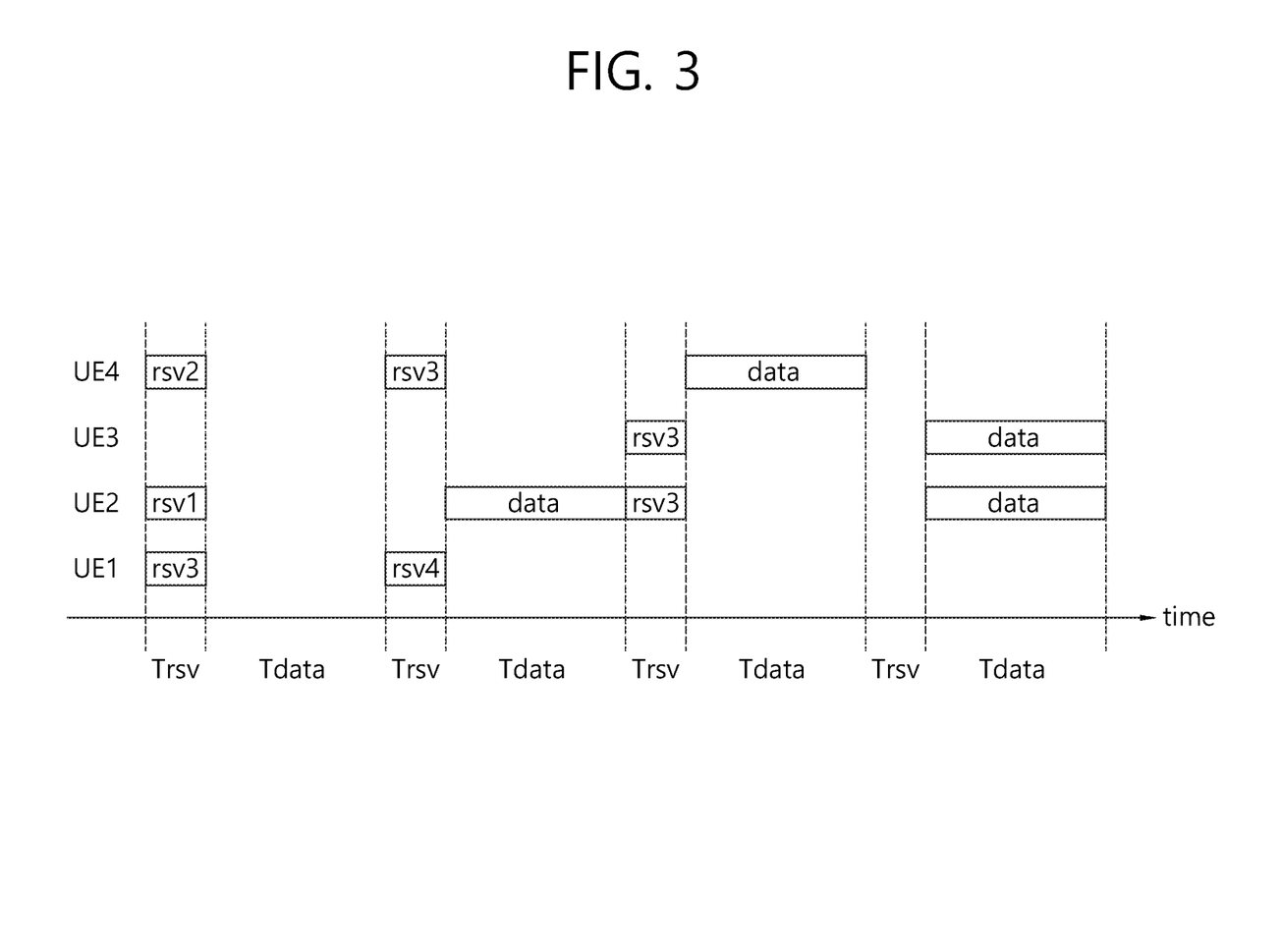
FIG. 3 illustrates a communication method according to another embodiment of the present invention.

FIG. 3 illustrates a communication method according to another embodiment of the present invention.

Compared with those in the embodiment of FIG. 2, a reservation time and a corresponding data time are not occur in succession but are separated by a certain period of time. Here, a Tdata following a Trsv after a Trsv is used for data transmission.

A processing time may be provided for a UE to detect a reservation signal transmitted by another UE and to determine whether to transmit a data packet thereof based on this reservation signal.

During a first Trsv, UE1, UE2, and UE4, which have succeeded in CCA, transmit rsv3, rsv1, and rsv2, respectively. Since rsv1 has the highest priority, UE2 transmits data during a second Tdata.

Figure 4:
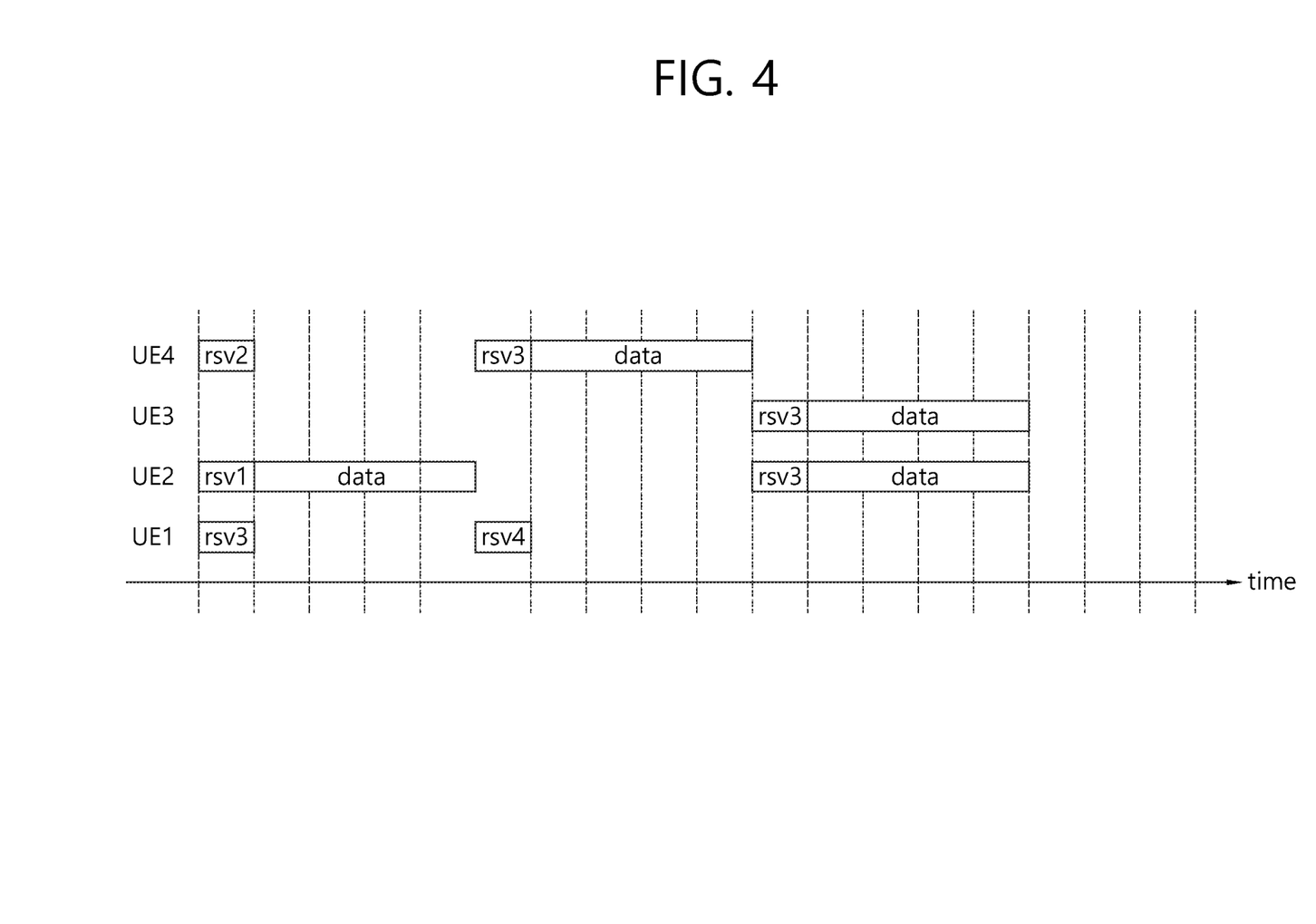
FIG. 4 illustrates a communication method according to still another embodiment of the present invention.

FIG. 4 illustrates a communication method according to still another embodiment of the present invention.

A reservation time may not necessarily be set separate from a data time, and a reservation signal may be transmitted at an arbitrary time within the reservation time.

UE1, UE2, and UE4, which have succeeded in CCA, transmit rsv3, rsv1, and rsv2, respectively, at an arbitrary time. Since rsv1 has the highest priority, UE2 transmits data during a Tdata. Each reservation signal may indicate information on time required for subsequent data transmission.

When UE 2 completes data transmission, UE 1 and UE 4, which have succeeded in CCA, transmit rsv4 and rsv3, respectively. Since rsv3 has higher priority, UE4 transmits data during a Tdata.

Figure 5:
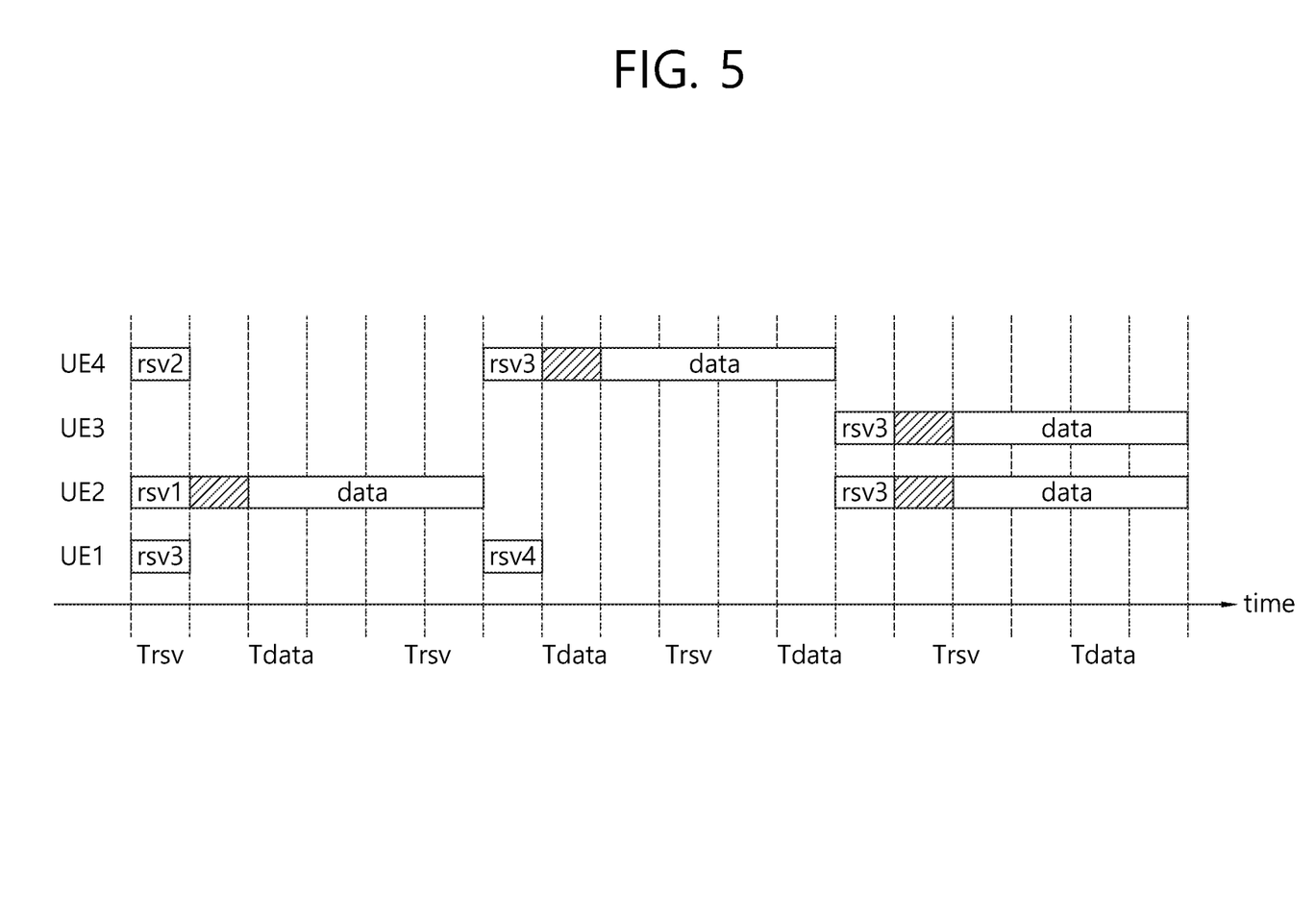
FIG. 5 illustrates a communication method according to yet another embodiment of the present invention.

FIG. 5 illustrates a communication method according to yet another embodiment of the present invention.

Compared with those in the embodiment of FIG. 2, a reservation time and a corresponding data time may not occur in succession but may be separated by a certain period of time, which is for providing a processing time. Here, a guard time (indicated by diagonal lines) is defined after a Trsv.

UE1, UE2, and UE4, which have succeeded in CCA, transmit rsv3, rsv1, and rsv2, respectively, at an arbitrary time. Since rsv1 has the highest priority, UE2 transmits data during a Tdata after a guard time.

UE2 may not transmit any signal during the guard time. Alternatively, to prevent channel access of another UE, the UE may continue to transmit the corresponding reservation signal during the guard time.

Figure 6:
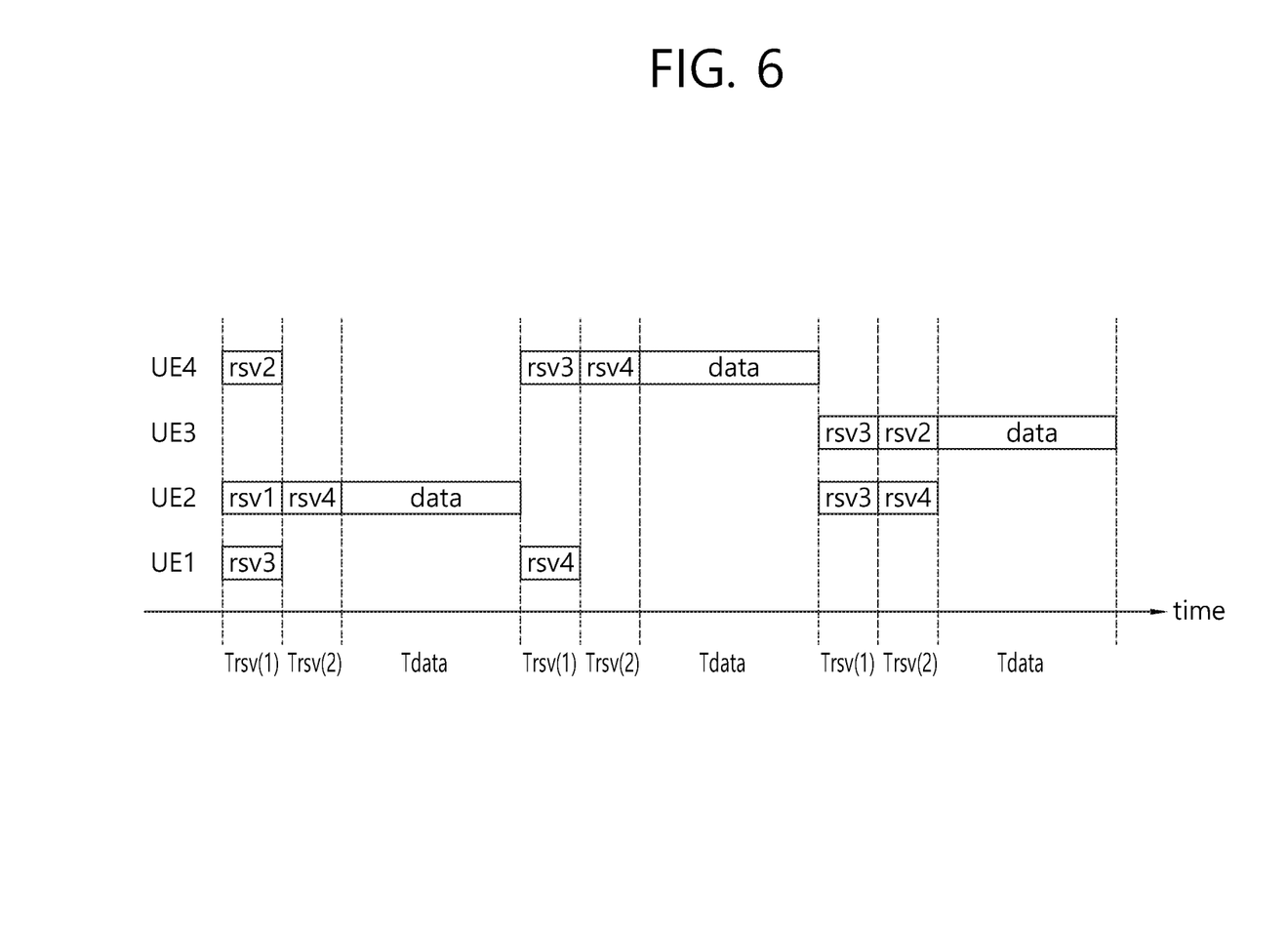
FIG. 6 illustrates a communication method according to still another embodiment of the present invention.

FIG. 6 illustrates a communication method according to still another embodiment of the present invention.

To reduce the number of reservation signals having the same priority transmitted by a plurality of UEs for the same Trsv, a plurality of Trsys may be set for one Tdata.

Suppose that N Trsys corresponding to a Tdata be Trsv(1), Trsv(2), . . . , Trsv(N). A UE, which has succeeded in CCA in Trsv(n) (n=1, . . . , N) and has transmitted a reservation signal, may operate as follows.

(1) When a reservation signal having higher priority than the reservation signal transmitted by the UE is detected in Trsv(n), the UE gives up signal transmission in a corresponding Tdata.

(2) When only a reservation signal having lower priority than the reservation signal transmitted by the UE is detected in Trsv(n), the UE transmits a randomly selected reservation signal or the same reservation signal in Trsv(n+1). When n=N, the UE transmits a signal in the corresponding Tdata.

(3) When no reservation signal transmitted by another UE is detected in Trsv(n), the UE transmits a randomly selected reservation signal or the same reservation signal in Trsv(n+1). When n=N, the UE transmits a signal in the corresponding Tdata.

(4) When only a reservation signal having the same priority as the reservation signal transmitted by the UE is detected in Trsv(n), the UE transmits a randomly selected reservation signal or the same reservation signal in Trsv(n+1). When n=N, the UE either transmits a signal randomly or with a certain probability in the corresponding Tdata or gives up signal transmission.

It is assumed in the embodiment of FIG. 6 that there are two Trsys (Trsv(1) and Trsv (2)).

During Trsv(1), UE1, UE2, and UE4, which have succeeded in CCA, transmit rsv3, rsv1, and rsv2, respectively. Since rsv1 has the highest priority, UE1 and UE4 give up transmission and UE2 transmits randomly selected rsv4 during Trsv(2). Subsequently, UE2 transmits data during a Tdata.

During next Trsv(1), UE1 and UE4, which have succeeded in CCA, transmit rsv4 and rsv3, respectively. Since rsv3 has higher priority, UE1 gives up transmission and UE4 transmits randomly selected rsv4 during Trsv(2). UE4 transmits data during a Tdata.

The start point of a plurality of Trsys may be fixed or may be a random point, and Tdatas corresponding to a plurality of Trsv may be sequent or be spaced apart.

In the following embodiments, it is assumed that a UE has no capability of simultaneously performing transmission and reception through the same radio resource. Compared with those in the embodiments FIGS. 2 to 6, a reservation signal has a sufficiently shorter length than a Trsv so that a UE can switch to a receiving operation and can detect a reservation signal transmitted from another UE in a time other than the time for transmitting a reservation signal thereof during the Trsv.

Figure 7:
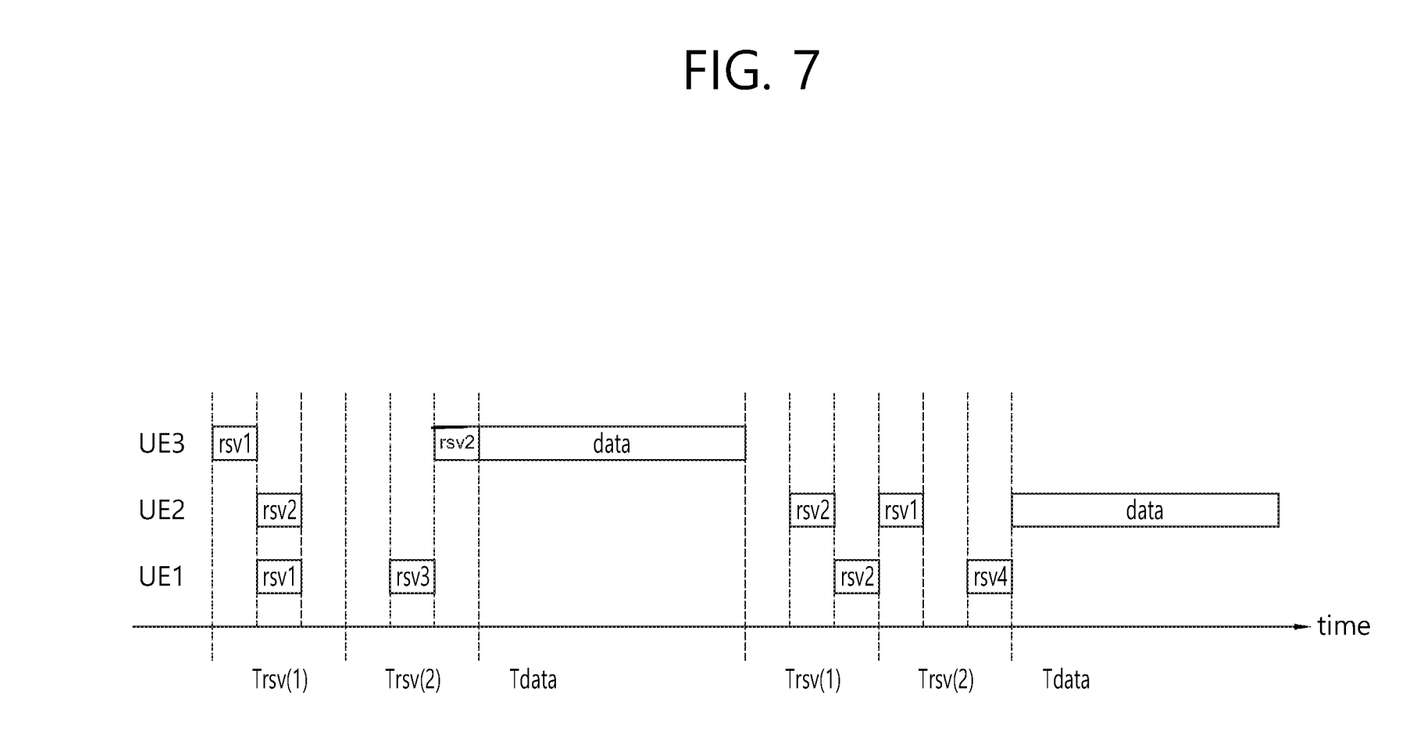
FIG. 7 illustrates a communication method according to yet another embodiment of the present invention.

FIG. 7 illustrates a communication method according to yet another embodiment of the present invention.

When a UE succeeds in CCA during a Trsv, the UE can transmit a reservation signal. The Trsv may be divided into a plurality of sub-periods for transmitting a reservation signal, and the UE can transmit a reservation signal when sequentially succeeding in CCA in each of the plurality of sub-periods. Alternatively, the UE may attempt CCA in a randomly selected sub-period of the plurality of sub-periods.

The UE, which has transmitted the reservation signal, detects a reservation signal from another UE during the corresponding Trsv. This operation is the same as that in the embodiment of FIG. 2 (where only one Trsv is defined) or the embodiment of FIG. 7 (where a plurality of Trsv's is defined).

It is assumed in the embodiment of FIG. 7 that there are two Trsv's (Trsv(1) and Trsv (2)).

During Trsv(1), UE1, UE2, and UE3 transmit rsv1, rsv2, and rsv1, respectively, in a corresponding sub-period. Since rsv1 has the highest priority, UE2 gives up transmission in next Trsv(2). During Trsv(2), UE1 and UE3 transmit randomly selected rsv3 and rsv2, respectively. Since rsv2 has higher priority, UE3 transmits data during a Tdata.

During next Trsv(1), UE1 and UE2 transmit rsv2 and rsv2, respectively. Since the reservation signals have the same priority, UE1 and UE2 transmit randomly selected rsv4 and rsv1, respectively, during Trsv(2). Since rsv1 has higher priority, UE1 transmits data during a Tdata.

Figure 8:
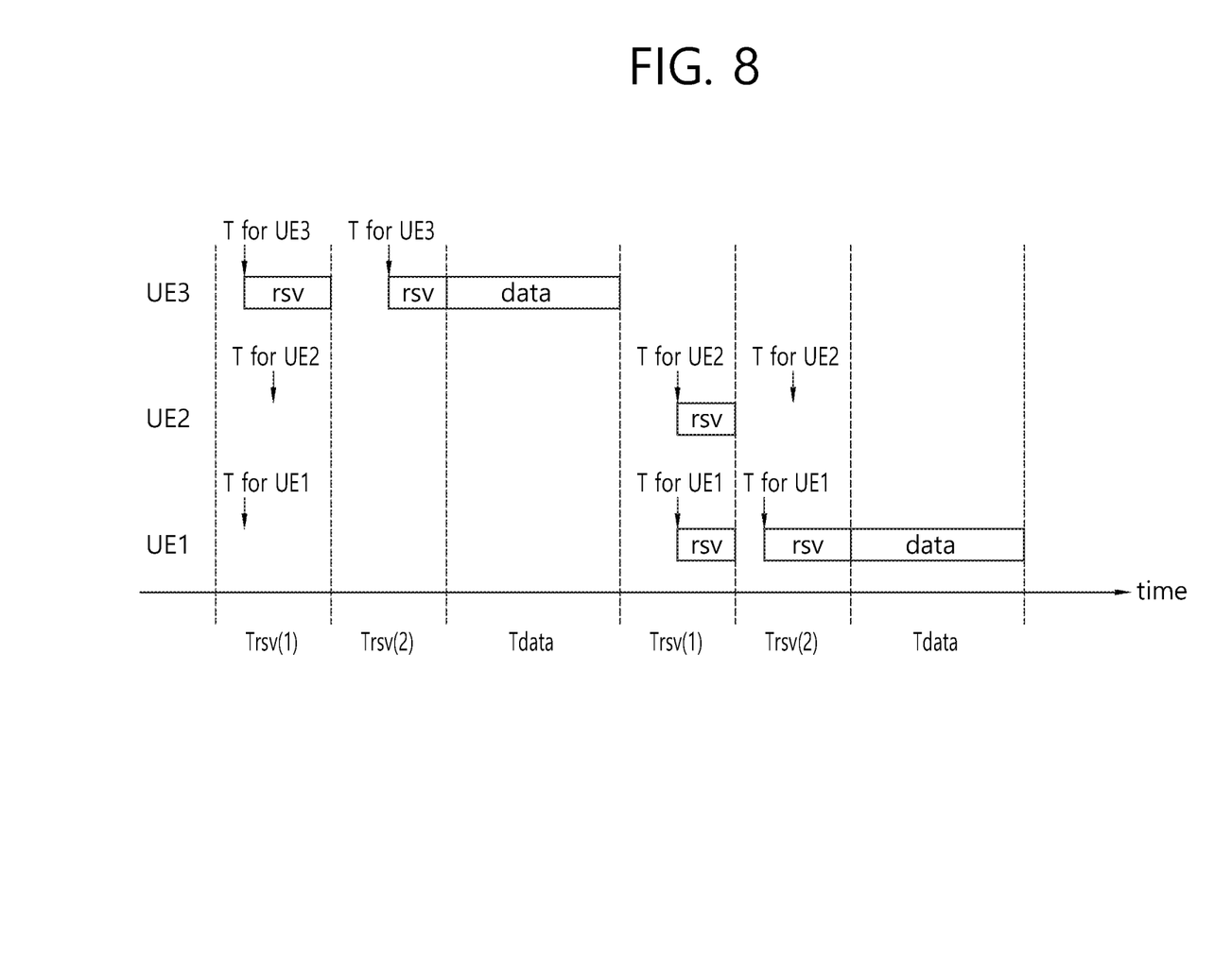
FIG. 8 illustrates a communication method according to still another embodiment of the present invention.

FIG. 8 illustrates a communication method according to still another embodiment of the present invention.

Compared with that in the embodiment FIG. 7, a UE, which has succeeded in CCA, starts to transmit a reservation signal at a random time point in a Trsv. The transmission of the reservation signal continues until the termination of the Trsv.

Since the transmission of the reservation signal continues until the termination of the Trsv, another UE fails in CCA, thus cannot transmit a reservation signal during the Trsv, and may give up data transmission in a corresponding Tdata.

A plurality of UEs may start to transmit a reservation signal at the same time. Since each UE cannot detect a reservation signal transmitted by another UE, the UE may start data transmission or may attempt to transmit a reservation signal at a random time in the next Trsv.

During Trsv(1), UE3 among UE1, UE2, and UE3 first starts to transmit a reservation signal. Accordingly, UE2 and UE3 give up data transmission. Only UE3 transmits a reservation signal during Trsv(2), and UE3 transmits data during a Tdata.

During next Trsv(1), UE1 and UE2 simultaneously start to transmit a reservation signal. UE3 gives up data transmission. During Trsv(2), UE1 and UE2 attempt to transmit a reservation signal, and only UE1, which has attempted first, transmits a reservation signal. Therefore, UE2 gives up data transmission, and UE1 transmits data during a Tdata.

Figure 9:
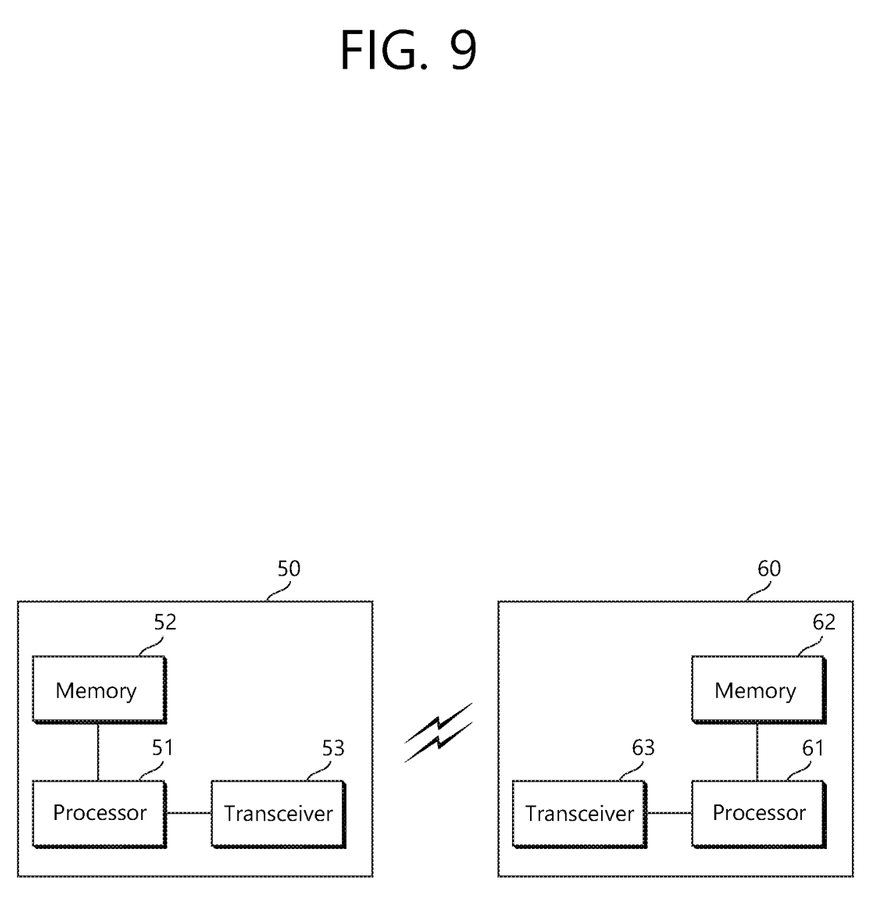
FIG. 9 is a block diagram illustrating a wireless communication system in which the embodiments are implements.

FIG. 9 is a block diagram illustrating a wireless communication system in which the embodiments are implements.

A wireless device 50 includes a processor 51, a memory 52, and a transceiver 53. The memory 52 is connected to the processor 51 and stores various instructions executed by the processor 51. The transceiver 53 is connected to the processor 51 and transmits and/or receives radio signals. The processor 51 implements proposed functions, processes, and/or methods. In the aforementioned embodiments, the operation of a UE may be implemented by the processor 51. When the aforementioned embodiments are implemented in software instructions, the instructions may be stored in the memory 52 and may be executed by the processor 51 to perform the aforementioned operation.

A BS 60 includes a processor 61, a memory 62, and a transceiver 63. The BS 60 may operate in an unlicensed band. The memory 62 is connected to the processor 61 and stores various instructions executed by the processor 61. The transceiver 63 is connected to the processor 61 and transmits and/or receives radio signals. The processor 61 implements proposed functions, processes, and/or methods. In the aforementioned embodiments, the operation of a BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating data in an unlicensed band, the method comprising:

transmitting, by a wireless device, a plurality of reservation signals during a plurality of reservation times;

attempting, by the wireless device, to detect a plurality of reservation signals transmitted by one or more different wireless devices during the plurality of reservation times; and selectively transmitting, by the wireless device, the data during a data transmission time based on the plurality of reservation signals transmitted by the wireless device and the plurality of detected reservation signals transmitted by the one or more different wireless devices, wherein each of the plurality of reservation times is divided into a plurality of sub-periods, and wherein each of the plurality of reservation signals is transmitted in one of the plurality of sub-periods.

2. The method of claim 1, wherein the reservation signal is transmitted when the wireless device succeeds in clear channel assessment (CCA) in an unlicensed band.

3. The method of claim 1, wherein the reservation signal is transmitted when the wireless device sequentially succeeds in clear channel assessment (CCA) in each of the plurality of sub-periods.

4. The method of claim 1, wherein the reservation signal is transmitted when the wireless device succeeds in clear channel assessment (CCA) in a randomly selected sub-period of the plurality of sub-periods.

5. The method of claim 1, wherein the plurality of reservation signals transmitted by the one or more different wireless devices is detected by the wireless device during a plurality of sub-periods that are not used for the transmission of the plurality of reservation signals.

6. The method of claim 1, wherein, when the detected reservation signal has a higher priority than the transmitted reservation signal during the reservation time, the wireless device does not transmit the data during the data transmission time.

7. The method of claim 1, wherein, when the detected reservation signal has a lower priority than the transmitted reservation signal or no reservation signal is detected during the reservation time, the wireless device transmits the data during the data transmission time.

8. The method of claim 1, wherein, when the detected reservation signal has a same priority as the transmitted reservation signal detected during a first reservation time of the plurality of reservation times, the wireless device selectively transmits the data during the data transmission time based on the detected reservation signal and the transmitted reservation signal in a next reservation time of the plurality of reservation times.

9. The method of claim 1, wherein the data transmission time follows after the plurality of reservation times.

10. The method of claim 1, wherein a guard time is defined between the reservation time and the corresponding data time.

11. A wireless device for communicating data in an unlicensed band, the wireless device comprising:

a transceiver configured to transmit or receive a radio signal; and a processor connected to the transceiver and configured to:

control the transceiver to transmit a plurality of reservation signals during a plurality of reservation times;

control the transceiver to attempt to detect a plurality of reservation signals transmitted by one or more different wireless devices during the plurality of reservation times; and selectively transmit the data during a data transmission time based on the plurality of reservation signals transmitted by the wireless device and the plurality of detected reservation signals transmitted by the one or more different wireless devices, wherein each of the plurality of reservation times is divided into a plurality of sub-periods, and wherein each of the plurality of reservation signals is transmitted in one of the plurality of sub-periods.

12. The wireless device of claim 11, wherein the reservation signal is transmitted when the wireless device succeeds in clear channel assessment (CCA) in an unlicensed band.

13. The wireless device of claim 11, wherein the reservation signal is transmitted when the wireless device sequentially succeeds in clear channel assessment (CCA) in each of the plurality of sub-periods.

14. The wireless device of claim 11, wherein the reservation signal is transmitted when the wireless device succeeds in clear channel assessment (CCA) in a randomly selected sub-period of the plurality of sub-periods.

15. The wireless device of claim 11, wherein the plurality of reservation signals transmitted by the one or more different wireless devices is detected by the wireless device during a plurality of sub-periods that are not used for the transmission of the plurality of reservation signals.

16. The wireless device of claim 11, wherein, when the detected reservation signal has a higher priority than the transmitted reservation signal during the reservation time, the wireless device does not transmit the data during the data transmission time.

17. The wireless device of claim 11, wherein, when the detected reservation signal has a lower priority than the transmitted reservation signal or no reservation signal is detected during the reservation time, the wireless device transmits the data during the data transmission time.

18. The wireless device of claim 11, wherein, when the detected reservation signal has a same priority as the transmitted reservation signal detected during a first reservation time of the plurality of reservation times, the wireless device selectively transmits the data during the data transmission time based on the detected reservation signal and the transmitted reservation signal in a next reservation time of the plurality of reservation times.

19. The wireless device of claim 11, wherein the data transmission time follows after the plurality of reservation times.

20. The wireless device of claim 11, wherein a guard time is defined between the reservation time and the corresponding data time.

* * * * *